(12) United States Patent
Hansen

(10) Patent No.: US 6,317,639 B1
(45) Date of Patent: Nov. 13, 2001

(54) AUTOMATIC WIRELESS DATA REPORTING SYSTEM AND METHOD

(75) Inventor: Anthony D. A. Hansen, Berkeley, CA (US)

(73) Assignee: Magee Scientific, Berkeley, CA (US)

( * ) Notice: Subject to any disclaimer, the term of this patent is extended or adjusted under 35 U.S.C. 154(b) by 0 days.

(21) Appl. No.: 09/328,054

(22) Filed: Jun. 8, 1999

(51) Int. Cl.[7] .................................................. G05B 15/00
(52) U.S. Cl. .................................. 700/83; 700/4; 700/9; 700/17; 702/3
(58) Field of Search ............................... 700/3, 4, 9, 23, 700/90, 106, 275, 17, 15, 83; 340/853, 825.06; 73/152.29, 861.63; 702/1, 3, 6

(56) References Cited

U.S. PATENT DOCUMENTS

| | | |
|---|---|---|
| 4,786,472 | 11/1988 | McConnell et al. .................. 422/61 |
| 4,893,934 | 1/1990 | Hansen ................................. 356/434 |
| 5,278,549 | 1/1994 | Crawford ............................. 340/853 |
| 5,406,265 * | 4/1995 | Trozzo et al. ....................... 340/632 |
| 5,553,492 | 9/1996 | Barrett et al. ..................... 73/152.29 |
| 5,608,171 | 3/1997 | Hunter et al. ..................... 73/861.63 |
| 5,646,863 | 7/1997 | Morton ................................. 702/23 |
| 5,661,464 | 8/1997 | Bilak et al. ......................... 340/690 |
| 5,689,562 * | 11/1997 | Hassan et al. ......................... 380/9 |
| 5,754,122 | 5/1998 | Li et al. ........................... 340/870.11 |
| 5,805,442 | 9/1998 | Crater et al. ............................ 700/9 |
| 5,815,090 | 9/1998 | Su ..................................... 340/870.16 |
| 5,835,724 * | 11/1998 | Smith .................................. 709/227 |
| 5,845,230 | 12/1998 | Lamberson ............................. 702/56 |
| 5,848,378 * | 12/1998 | Shelton et al. .......................... 702/3 |
| 5,920,827 * | 7/1999 | Baer et al. .............................. 702/3 |
| 5,940,776 | 8/1999 | Baron et al. ............................ 702/4 |
| 5,979,757 * | 11/1999 | Tracy et al. .......................... 235/383 |
| 6,023,223 * | 2/2000 | Baxter, Jr. ............................ 340/531 |
| 6,061,690 * | 5/2000 | Nori et al. ............................ 707/103 |
| 6,114,964 * | 9/2000 | Fasano ................................. 340/632 |

OTHER PUBLICATIONS

Draft Concept Paper for PM Measurement Research; EPA/NARSTO Pm Workshop brochure, pp. 1–34; (Jul. 1998).
Product Profile: Andersen Hazardous Air Pollutant Samplers; Andersen Instruments, Inc. pp. 1–5,35.
http://www.cambellsci.com; various pages—11 pages total (printed out Dec. 21, 1998).
Andersen Instruments, Inc. Aethalometer Real–Time Aerosol Analyzer product flyer.

* cited by examiner

*Primary Examiner*—William Grant
*Assistant Examiner*—Kidest Bahta
(74) *Attorney, Agent, or Firm*—Coudert Brothers (57) ABSTRACT

Instrumentation systems and methods for monitoring an environmental condition at a location are disclosed. Embodiments of the invention include wireless communication elements which can transmit pictorial image data from a location being monitored to a server computer. Persons at one or more client computers can view a pictorial image generated from the pictorial image data from any suitable location at any suitable time.

19 Claims, 3 Drawing Sheets

AUTOMATIC WIRELESS DATA REPORTING SYSTEM AND METHOD

TECHNICAL FIELD

The invention relates to methods and systems for monitoring an environmental condition.

BACKGROUND OF THE INVENTION

Monitoring and detecting contaminants in the environment has become increasingly important as the population becomes more environmentally conscious. Federal, state and local government agencies have recognized the need to monitor levels of pollutants in the environment quickly and accurately. For example, the United States Environmental Protection Agency (U.S.E.P.A.) has recently indicated that rapidly acquiring environmental data of pollution is important, and even necessary, to adequately warn the public of potentially harmful conditions in the environment.

Many locations, however, do not have or are not equipped with devices which are suitable for monitoring environmental conditions. Such locations may not have monitoring devices or may not be equipped to support monitoring devices for a number of reasons. For example, electrical and/or telephone lines may not be present or are scarce at a particular location, thus making it difficult to support monitoring equipment at that location.

Even if electrical and telephone lines are present at a particular location, it may be that monitoring devices have not been provided at the particular location, because the environmental condition of interest was the result of an unexpected occurrence. For example, a grass fire recently torched California's biggest pile of used tires in Tracy, Calif. Over seven million tires burned and smoldered in a gravel pit for over six months. During this time, residents near and far were concerned about the byproducts from the burning tires contaminating the groundwater and the air. Since this fire was not expected, equipment to monitor the effects of the fire were not present at the site. Even after the need to monitor the site became apparent, monitoring the effects of the fire on the environment was difficult because few electrical and telephone lines were present to support monitoring equipment.

Conventional methods have been used to monitor environmental conditions. However, many of these conventional methods could be improved. For example, in one illustrative monitoring method, an air pollution data collection device at a first location collects raw air pollution data. An operator at the first location receives the raw data from the data collection device in a print out form and transmits the form to a technician at another location. The technician receives the raw data and produces a graph from it. The graph is proofed and then transmitted by facsimile to persons who are interested in viewing the graph. The time between the collection of the data and the receipt of the graph by the interested viewers can be 24 hours or more. The graph can be sent to the interested viewers at least once per day so that they can monitor the environmental condition at the first location on a regular basis.

While conventional environmental monitoring processes such as this one can be performed relatively quickly, there are a number of disadvantages to this type of monitoring process. First, the interested viewer views the graph at a quasi-random time, because the graph is received by the interested viewer at a quasi-random time. The time at which the graph is received by the interested viewer depends on how quickly the operator and the technician perform their duties. Second, the graph cannot be easily shared by other interested viewers at different locations. In some conventional methods, the graphed data is separately transmitted to each interested viewer by facsimile. Transmitting graphed data in this manner is very time consuming and cumbersome. Third, although graphed data can be generated within 24 hours of data collection, this period of time may be too long to be useful or helpful in some instances. For example, if the concentration of a substance in the supply of drinking water in an area has risen to potentially harmful levels, the people living in the area need to know this as soon as possible so that they can take appropriate action. Finally, technicians or other qualified personnel are required on a continuous basis to process the data.

Accordingly, there is a need for an improved method and instrumentation system for monitoring an environmental condition.

SUMMARY OF THE INVENTION

Embodiments of the invention are directed to instrumentation systems and methods for monitoring an environmental condition.

One embodiment of the invention is directed to an instrumentation system for monitoring an environmental condition. The instrumentation system comprises: an electronic data collection device for collecting environmental data at a first location, wherein the environmental data comprises data of the concentration of a predetermined substance in the atmosphere; a computer processor located at the first location and operatively coupled to the data collection device, the computer processor receiving the collected environmental data from the data collection device; an information storage medium operatively coupled to the computer processor and having a computer program for converting the collected data into pictorial image data (e.g., conventionally decodable pictorial image data); a first wireless communication element operatively coupled to the computer processor for transmitting the pictorial image data as a radio frequency signal; a second wireless communication element for receiving the signal transmitted by the first wireless communication element; and a server computer at a second location operatively coupled to the second wireless communication element.

Another embodiment is directed to a method for monitoring an environmental condition. The method comprises: electronically collecting environmental data values at a first location, wherein the environmental data comprises data of the concentration of a predetermined substance in the atmosphere; electronically converting the collected environmental data values into pictorial image data; transmitting the pictorial image data from a first wireless communication element to a second wireless communication element as a radio frequency signal, transmitting the pictorial image data from the second wireless communication element to a server computer at a second location; transmitting the pictorial image data from the server computer to a client computer optionally located at a third location; and displaying a pictorial image from the pictorial image data. The pictorial image data is typically in the form of a data file.

Embodiments of the invention can be used to monitor an environmental condition at a first location on a regular basis and preferably in real time. Pictorial images representing the environmental condition can be viewed by one or more interested viewers at any location and at any time convenient to the viewer. It is not necessary for the viewer to have access to specialized data reduction and analysis software. In preferred embodiments, the pictorial images are presented to the interested viewer using conventional image presentation software that is standard for most computers and Internet browsers. Skilled personnel used for creating and proofing pictorial images such as graphs are not needed, and do not delay the presentation of the pictorial image to the interested viewer.

Embodiments of the invention can advantageously use pre-existing, publicly accessible communication networks including, e.g., the Internet. By using pre-existing publicly accessible communication networks, the costs and delays of providing specialized communication links to transfer data are avoided. This minimizes the cost of both creating and maintaining the system.

These and other embodiments of the invention can be described with reference to the following figures and detailed description of the invention.

DETAILED DESCRIPTION

In embodiments of the invention, any environmental condition relating to or affecting the normal state of the environment at a particular location can be monitored. Examples of environmental conditions to be monitored include the level of pollution, the temperature, and the amount of rainfall at the location.

In preferred embodiments, the environmental condition at the first location to be monitored is the level of pollution. The level of pollution is preferably monitored by measuring the concentration of a specific substance (e.g., a contaminant) or the total amount of the substance in the air, water, or land. For example, the concentration of volatile organic compounds (VOCs), carbon oxides, sulfur-containing compounds such as sulfur oxides, nitrogen oxides, ozone, and hydrocarbons in the air can be measured. The concentration of particles such as carbon black, mineral dust, and sulfate and nitrate salts in the air can also be measured. In another example, the concentration of man-made chemicals or oil in the land or water can be measured. The presence or concentration of biological contaminants such as viruses and microorganisms at the first location can be monitored as well.

Figure 1:
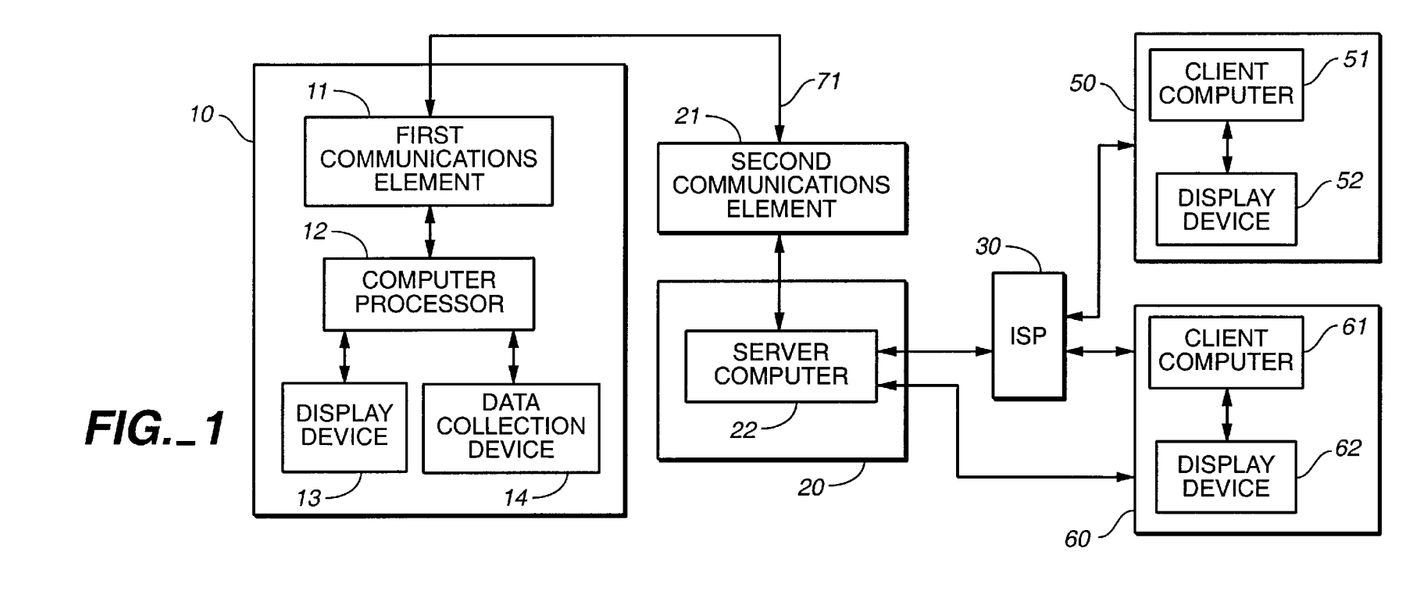
FIG. 1 shows a block diagram of an instrumentation system according to an embodiment of the invention.

FIG. 1 shows a first location 10 where an environmental condition is to be monitored. The first location 10 is a location where devices for monitoring the environmental condition of interest are not normally present. Alternatively or additionally, the first location preferably does not have an existing infrastructure of electrical and/or telephone lines suitable or available for supporting equipment for monitoring the environmental condition of interest. Preferably, the first location is physically remote from persons who are interested in monitoring the environmental condition at the first location 10. For example, the persons monitoring the environmental condition may be located at one or more client computer locations located a distance of about one mile or more from the first location 10. Examples of first locations include locations having bodies of water including shorelines, lakes, the ocean, and reservoirs. Other examples of first locations include waste disposal facilites and remotely located industrial facilities.

In the system, a data collection device 14 is present at the first location 10 to collect data characterizing the environmental condition. Data provided by the data collection device 14 can be in a digital or analog format. Examples of suitable data collection devices include dataloggers, temperature sensors, oxygen sensors, and rain gauges. Preferably, the data collection device 14 is a pollution data collection device such as a gas pollution analyzer or a water pollution analyzer. An example of a particularly preferred data collection device is an optically-based electronic data collection device such as an aethalometer. Suitable aethalometers which can be used in embodiments of the invention are described in U.S. Pat. No. 4,893,934,which is herein incorporated by reference in its entirety for all purposes. Aethalometers are especially desirable, because they can accurately measure the concentration of carbon-containing substances (e.g., carbon particles) in the air.

A computer processor 12 at the first location receives the raw environmental data from the data collection device 14. Subsequently, the computer processor 12 transforms the received raw data into pictorial image data, which is preferably in a data file. The computer processor 12 may be a single computer chip, multiple computer chips, or other computational device. For example, the computer processor 12 may be a microcomputer processor such as those used in many personal computers, laptop computers, minicomputers, and workstations. The computer processor 12 can also be a dedicated computer board capable of processing data. Regardless of the type of computer processor used, the computer processor may have an architecture compatible with a DOS or a Windows™ based operating system.

The computer processor 12 can use any number of suitable computer programs, written in any suitable programming language, to facilitate monitoring at the first location. For example, the computer processor 12 can use suitable computer programs for controlling any peripheral device or element at the first location. In particular, the computer processor can use computer programs for controlling the data collection device, the display device, and the wireless communication element. The system can also include one or more computer programs for creating pictorial image data (e.g., data representing a graphical image) from raw data and for storing the created pictorial image data on an information storage medium in communication with the computer processor 12. Computer programs for recovering the system (e.g., due to power outages) and indicating that recovery has occurred, recognizing the presence of connected devices or elements, relinquishing control from input devices, calibrating, and providing scaling factors (e.g., for externally-connected analog sensors) can also be provided.

Although special software and computer programs may be used to collect, analyze, reduce, and present the raw data in an intuitive pictorial image, the pictorial image created is stored and is subsequently transmitted using standard image-encoding protocols. Thus, the image can be viewed using standard image decoding software found on most computers and associated with most Web browsers.

In addition to storing pictorial image data, information storage media (not shown) at the first location can store information such as system operating parameter information, information of collected data, and other information. Suitable information storage media include memory chips such as flash EEPROM, EPROM, and ROM chips. Preferably, memory chips such as these store operating parameters for the computer processor. The information storage media can also include optical or magnetic storage devices such as disk or tape drives for storing data. Data storage cards may also be used to store information.

The data collection device 14 is operatively coupled to the computer processor 12 so that the computer processor 12 receives data from the data collection device 14. For example, the computer processor 12 can be in a housing which has a communications port such as a COM, RS485, RS232, or USB port. An interface element such as a cable can be used to couple and decouple the data collection device 14 and the computer processor 12 via the port.

The data provided by the data collection device 14 can be in any suitable form. For example, the data transmitted by the data collection device 14 and received by the computer processor 12 can be in the form of analog voltage or current (e.g., 0 to 5 volts DC or 4 to 20 mA DC signals) to be converted to digital data by an analog-to-digital converter. If the data collection device 14 is an analog device, the computer processor 12 can be capable of converting analog data to digital data. Alternatively, an analog-to-digital converter can be disposed between the data collection device 14 and the computer processor 12 for converting analog data into digital data.

A display device 13 may be optionally coupled to the computer processor 12. For example, the display device 13 can be coupled to the computer processor 12 with an interface element such as a cable, or may be incorporated with the computer processor 12 in a unitary housing. Preferably, the computer processor 12 directs display device 13 to display a pictorial image of the pictorial image data created by the computer processor. Providing a display device 13 at the first location 10 can be desirable if, e.g., an operator monitors the environmental condition at the first location 10. For example, an operator viewing regularly presented pictorial images of the monitored environmental condition can determine if the data collection device is collecting data in the intended manner.

The display device 13 may display a user interface which displays operational parameters to an operator. For example, in addition to other information, the user interface may display the frequency of data acquisition, the telephone number for access to an Internet service provider, and representational information that objects are being uploaded or updated.

An operator can provide data to the system or modify operating parameters by using one or more input devices. The input devices can be coupled to the computer processor via one or more interface elements such as cables having plug connections. Cables with plug connections permit these additional input devices to be removed during normal data collection operations. Illustratively, if operator intervention is desired, an input device such as a keyboard can be coupled to the computer processor through plug connections so that the operator can interact with the computer processor and review or change operating parameters. For example, memory chips in communication with the computer processor can be pre-programmed at an office or laboratory with the desired operating parameters. In the field, a portable computer may be operatively coupled to the computer processor via a cable with plug connections. An operator can then review or change the pre-programmed operating parameters which are stored permanently or temporarily in the memory chips with a keyboard on the portable computer. After the parameters are changed, the portable computer can be decoupled from the computer processor and monitoring can resume. In other embodiments, an operator may be able to change the operating parameters of the computer processor from a client computer.

Power can be provided to any device or element at the first location with any suitable power supply device (not shown). Exemplary power supply devices include a transformer, a battery, or a solar panel. For example, the power devices at the first location can be powered from a noise and transient isolated 12 volt DC connection.

Any of the devices or elements at the first location can be housed in separate housings or in the same housing in any suitable combination. For example, the data collection device 14, the display device 13, the computer processor 12, and the first wireless communication element 11 can be housed in a single housing, or may be housed in separate housings in any suitable combination. Regardless of which particular devices and elements are housed together, the housings are preferably made so that data collection and data processing can be performed unattended for extended periods of time even in adverse weather. In this regard, the housings are preferably weatherproof (e.g., water-repellant). Since the functioning portions of the devices and elements at the first location can be protected from the natural elements (e.g., the rain), systems according to embodiments of the invention are adapted to operate unattended by humans for extended periods of time. Moreover, any devices or elements at the first location, e.g., the data collection device 14 and/or the computer processor 12 are preferably portable so that they can be transported to any desired location.

A first wireless communication element 11 is present at the first location and is operatively coupled to the computer processor 12. The first wireless communication element 11 can be used for transmitting the pictorial image data to a second wireless communication element 21. The first and second wireless communication elements 11, 21 preferably include wireless transceivers. Exemplary wireless communication elements may include cellular telephones, wireless digital telephones, and wireless digital or analog communication units (e.g., a card with a modem and a transceiver). The wireless communication elements typically have antennae and may be selectively coupled and decoupled to the computer processor 12 (e.g., via a cable), or may be hardwired or selectively coupled to a circuit board in communication with the computer processor 12. Also, the first and second wireless communication elements 11, 21 can be the same or different, and can transmit or receive analog or digital data. Preferably, the first and second wireless communication elements 11, 21 are adapted to transmit and/or receive radio frequency (RF) signals. By using wireless communication elements to transmit information from the first location, land telephone lines need not be provided at the first location. Advantageously, the environmental condition at the first location can be monitored, even though facilities for supporting monitoring equipment are scarce or are not present.

The first and second wireless communication elements 11, 21 communicate with each other via any suitable wireless communication network 71. The communication network 71 can facilitate the transmission of data in digital or analog form over wide areas. Examples of suitable wireless communication networks include cellular, GSM, and PCS networks. Advantageously, embodiments of the invention use existing, publicly accessible, wireless communication networks. This greatly minimizes the amount of communications equipment which must be produced and maintained, in comparison to many conventional instrumentation systems. Moreover, the communication network used by the system is easy to use, and does not require specialized electronics equipment to work. Consequently, embodiments of the invention are less expensive to produce, maintain, and operate than many conventional instrumentation systems.

The system also includes a server computer 22 at a second location 20 for storing the pictorial image data received from the second wireless communication element. The second location can be located one mile or more from the first location 10. Typically, the server computer 22 is a powerful computer or cluster of computers that behaves as a single computer which services the requests of one or more client computers. The server computer can be a mainframe computer, a minicomputer, or a minicomputer cluster. For example, the server computer may include one or more database servers and one or more Web servers.

The system can include a second information storage medium (not shown) which may be on or accessible to the server computer 22. Examples of suitable information storage media include optical or magnetic disk drives and tape drives. The information storage medium can store data of a Web site along with the pictorial image data generated by the computer processor 12. The pictorial image data can reside on the server computer as one or more temporary data files. As data is collected by the data collection device 14 and is processed by the computer processor 12, the one or more temporary files may be rewritten as data is collected by the data collection device 14 and processed by the computer processor 12. Alternatively or additionally, these files may be saved to provide an archive of historical data.

The system includes one or more client computers 51, 61 located at one or more third locations 50, 60. The third location is preferably located at least one mile from each of the first and second locations. Normally, the client computers are operated by persons interested in viewing the pictorial image generated from the pictorial image data. The client computers usually communicate with a single server one at a time, although they can communicate with one another via the server or can use the server to reach other servers. Typically, client computers are less powerful and have less memory than the server computer.

The client computers 51, 61 can include a browser program. A browser permits a client computer to access the Internet and the Web site displaying the pictorial image of the environmental condition being monitored. Suitable browsers include Netscape Navigator™ and Microsoft's Internet Explorer™. Advantageously, in embodiments of the invention, special computer programs for manipulating data of the environmental condition need not be provided at each of the client computers. This reduces the cost to the persons who desire monitoring the environmental condition at the first location, and thus increases the number of potential interested viewers.

Display devices 52, 62 can be operatively coupled to the client computers 51, 61 and can be the same or different than the display device 13 at the first location. Suitable display devices include video terminals, active matrix displays, etc. The client computers 51, 61 can direct the display devices 52, 62 to display the pictorial image of the environmental condition.

The server computer 22 and one or more client computers 51, 61 can communicate with each other via the Internet, and in particular, the World Wide Web. By using the Internet, any interested person who has access to the Internet can view the pictorial image derived from the pictorial image data and thus monitor the environmental condition at the first location. People at different locations including the home, office, or university can view the pictorial image data at any suitable time. Regularly updated pictorial images of the environmental condition are provided so that the interested person can easily comprehend the environmental condition at the first location. Moreover, many persons can conveniently view the updated pictorial images of the environmental condition so that they can be accurately informed of the environmental condition at the first location in real time or near real time from any suitable location. Also, since Internet users are typically billed for connectivity at a single rate, the long-distance charges which might accrue through the use of telephone lines for data communication are eliminated. In comparison to systems which might use long-distance telecommunication links to transmit data, embodiments of the invention are cost-effective.

The system can include an Internet service provider (ISP) 30 so that the client computers 51, 61 can access the Internet. Alternatively, the client computers 51, 61 can access the Internet without an ISP. Alternatively, the client computers 51, 61 can access the Internet and the server computer without the use of an intermediate ISP.

Figure 2:
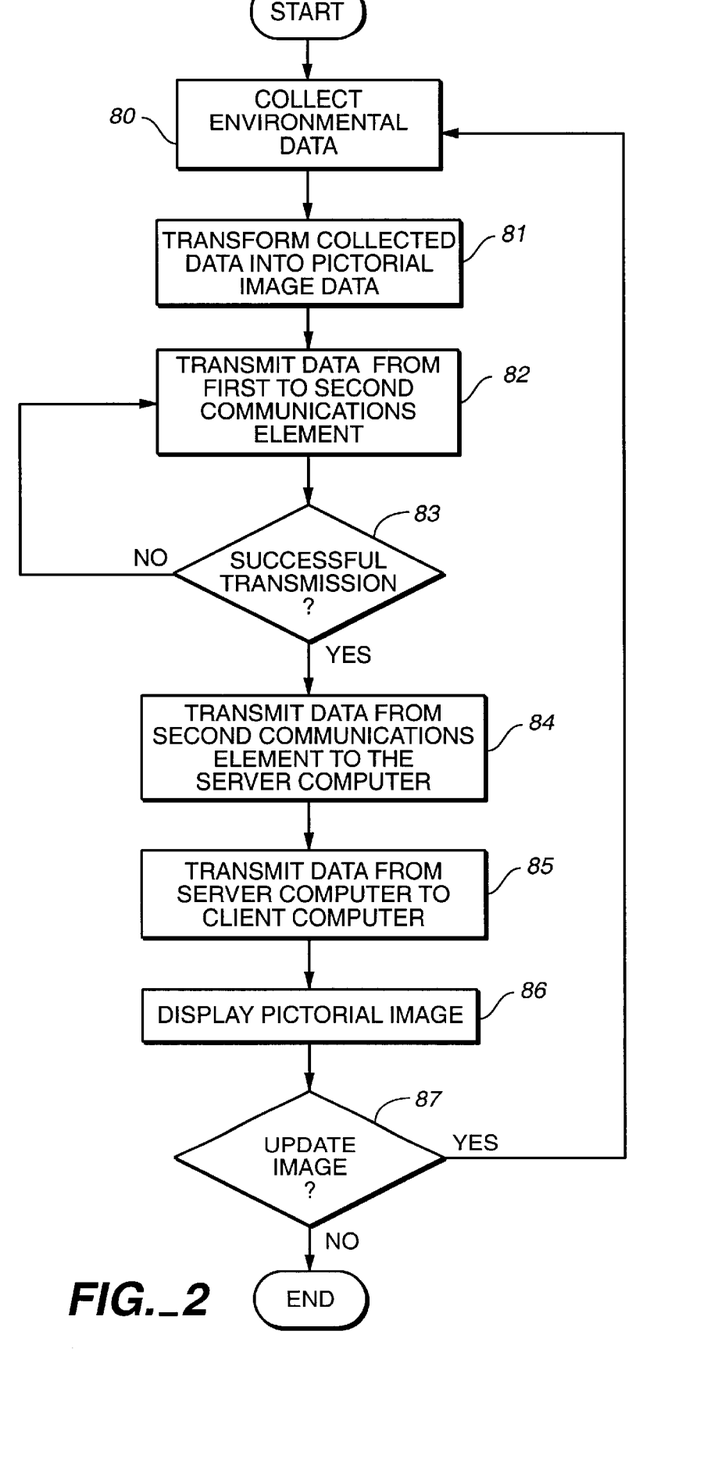
FIG. 2 shows a flowchart illustrating an example of a method according to an embodiment of the invention.

Methods according to embodiments of the invention can be described with reference to FIG. 2. FIG. 2 shows an example of a method according to an embodiment of the invention.

Data of an environmental condition at a first location is collected 80 with a data collection device. Preferably, the data is collected at regular intervals of time. For example, data can be collected at every second, every minute, hourly, weekly, or monthly intervals, or pursuant to a specified schedule. The data collection device may also collect data on demand, at the request of an operator at the first location or by a person viewing the pictorial image of the environmental condition at the first location.

Figure 3:
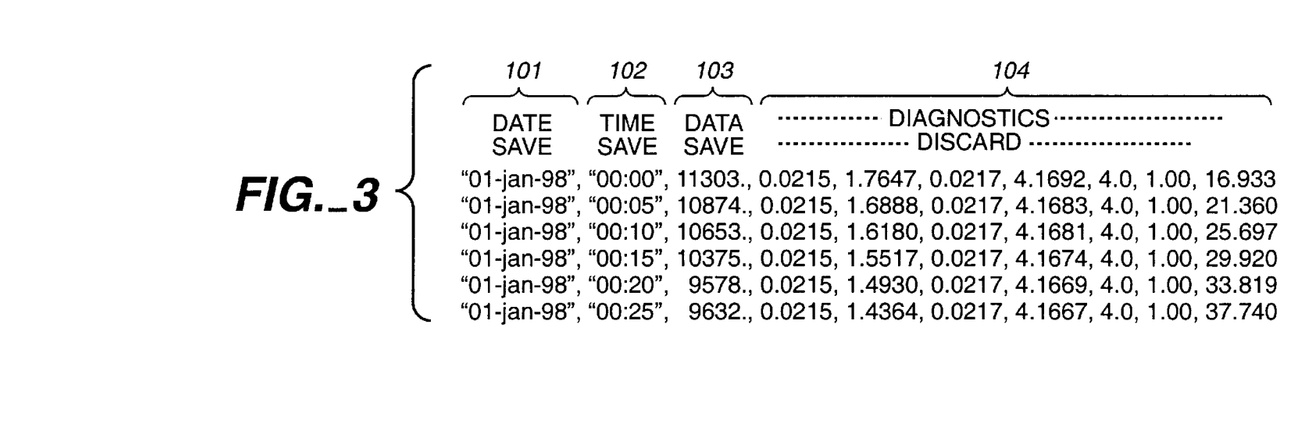
FIG. 3 shows raw data collected by an aethalometer.

The data collected and provided by the data collection device 14 may comprise raw data or data which has not yet been manipulated into pictorial image data. For example, FIG. 3 shows an example of raw data provided by an aethalometer. The data shown in FIG. 3 includes: a column 101 listing the date a data point was collected and saved; a column 102 listing the time a data point was collected and saved; a column 103 listing a number that represents the raw data point collected (e.g., carbon black concentration in air); and columns 104 of various diagnostic data. As can be seen in FIG. 3, it is difficult to readily see second level trends in the collected data. For example, while it can be observed that the magnitude of the data is generally decreasing over time, it is not is not easy to observe, e.g., the smoothness of the decrease. Moreover, other features are not easily discernable as would be the case if the environmental data were graphed.

After receiving the data from device 14, the computer processor 12 can transform the raw data into pictorial image data 81. The computer processor at the first location can use an appropriate computer program to manipulate the data received from the data collection device and transform it into pictorial image data. For example, the computer processor can use a graphing computer program to form data representing a graph from the raw environmental data received from the data collection device.

The pictorial image data is data representing a pictorial image. For example, the pictorial image data may be in a data file such as a graphics file. Examples of graphics files include GIF (graphic interchange format) or JPEG (joint photographics experts group) files. Pictorial images generated from the pictorial image data are more easily comprehendible than the raw data collected at the first location.

The pictorial image can be a graph such as a bar graph, or a continuous plot. For example, the graph can be a continuous plot of the concentration of a specific substance vs. time. In other embodiments, the pictorial image need not be a graph, but can be an image such as a continuously updated image of a meter. The pictorial image can also include identifiers such as the particular data collection device used, the location monitored, and the name of the Web site displaying the pictorial image.

Generating pictorial image data with the computer processor at the first location has a number of advantages. First, by forming pictorial image data at the first location, the corresponding pictorial image can be viewed at the first location. An operator viewing the pictorial image can take corrective action if the monitored environmental condition at the first location becomes unacceptable. Second, because pictorial image data of a pictorial image is created at the first location, there is no need to provide the client computers with specialized computer programs for reducing, graphing, or displaying the received data. Special equipment or software are not required at the client computers. For example, the client computers need only use a standard browser (or other standard software tools such as plug-ins) to be able to monitor the environmental condition at the remote location. Consequently, people can conveniently monitor the environmental condition at the first location using embodiments of the invention.

Once generated, the pictorial image data is transmitted from the computer processor to the first wireless communication element. After receiving the pictorial image data, the first wireless communication element transmits the pictorial image data to the second wireless communication element 82 as a radio frequency signal. The pictorial image data is transmitted from the first wireless communication element to the second wireless communication element via a wireless communication network such as a cellular phone network. This process can be initiated by directing the computer processor to prompt the first wireless communication element to contact an Internet service provider (ISP). After contact with the ISP is made, the computer processor is in communication with the Internet. Once access to the Internet is provided, the server computer at the second location can be contacted by the computer processor so that the server is in communication with the computer processor. Then, the pictorial image data can be transmitted from the computer processor at the first location to the server at the second location.

Embodiments of the invention are adapted to handle any potential errors which may occur during transmission of the pictorial image data over the wireless communication network. When transmitting information between communication elements via a wireless network, problems such as time-outs, bad file transfers, drop-outs, etc. can sometimes occur. These problems in data transmission can be due to excessive noise or interference caused by any number of man-made or natural causes (e.g., the weather). If a stream of raw data is transmitted from a first wireless communication element to a second wireless communication element, these interruptions can result in some of the collected data being lost during the transmission of the data. Consequently, the data received by the second wireless communication element, and a graph generated from this received data, may be incomplete thus providing the interested person with a potentially inaccurate view of the environmental condition.

In preferred embodiments of the invention, the pictorial image data is created at the first location before any of the data used to create the pictorial image data is transmitted to the second wireless communication element. Complete pictorial image data can be created before transmission over the wireless communication network. The system can automatically determine if complete or near complete transmission of the pictorial image data has occurred 83. If it is determined that transmission of the pictorial image data was not complete, then the entire pictorial image data can be re-transmitted over the wireless communication network until complete transmission of the object is complete. If transmission of the pictorial image data was successful, then the received pictorial image data can be transmitted from the second wireless communication element to the server computer 84. Advantageously, the pictorial image data is transmitted to the server computer in its entirety, and persons monitoring the environmental condition will view a complete pictorial image of the environmental condition.

Transmission completion data or a transmission completion program may be provided to verify that the pictorial image data has been transmitted in its entirety. For example, a handshake program can be used at the first location to assist in the transmission of a complete graph data from the first to the second wireless communication element. A typical handshake program indicates that complete transmission of the data from the first to the second wireless communication element has occurred. In other embodiments, lines of code indicating that the end of the pictorial image data has been transmitted from the first wireless communication element can be provided. If the lines of code are transmitted, the computer processor may indicate that complete transmission of the pictorial image data has occurred. If the transmission of the pictorial image data is interrupted and complete transmission of the pictorial image data has not occurred, then the computer processor can start over and can re-transmit the pictorial image data from the first to the second wireless communication element. This process can be repeated until complete transmission of the pictorial image data over the wireless communication network has occurred. Advantageously, a complete pictorial image data can be transferred to the server computer, and a complete pictorial image representing the environmental condition can be viewed by interested persons.

Once received, the pictorial image data can reside on an information storage medium (not shown) on the server computer. The pictorial image data can be stored on the information storage medium to provide an archive of pictorial images representing the environmental condition at the first location. Preferably, the pictorial image data can be incorporated with data of a Web site which is also on the server computer. The Web site and a pictorial image generated from the pictorial image data can be viewed by visitors to the Web site. In particular, the pictorial image can be displayed on a Web page on the Web site.

One or more interested viewers at one or more client computers can direct the client computers to contact the server computer. This can be done by providing an appropriate Web site address to the server computer. The client computer contacts the server computer and then transmits the pictorial image data from the server computer to the one or more client computers 85.

After receiving the pictorial image data, the client computer, using an appropriate computer program, can direct a display device in communication with the client computer to display a pictorial image generated from the pictorial image data 86. In preferred embodiments, the pictorial image data is transmitted after an identifier such as a password or a personal identification number is provided to the system by the interested viewer. In embodiments of the invention, the interested viewer at the client computer may also download one or more historical files for review.

If the pictorial image is to be updated 87, then more data can be collected at the first location, and the steps described above can be repeated to provide a regularly updated pictorial image of the environmental condition. For instance, the computer processor can receive a regular stream of data from the data collection device so that the pictorial image data and the pictorial image seen by persons is regularly (e.g., continuously) updated in response to the data collected by the data collection device. For example, the pictorial image and pictorial image data may be updated as often as data is collected. Preferably, the continuously updated pictorial image provides real time or near real time information of the environmental condition at the first location. The pictorial image data and pictorial image can be updated at predetermined times, at regular intervals, or whenever data is collected by the data collection device. In other embodiments, the system can be suspended or shut down during predetermined times. For example, to conserve energy, it may be desirable to stop collecting data during the nighttime.

EXAMPLE

Figure 4:
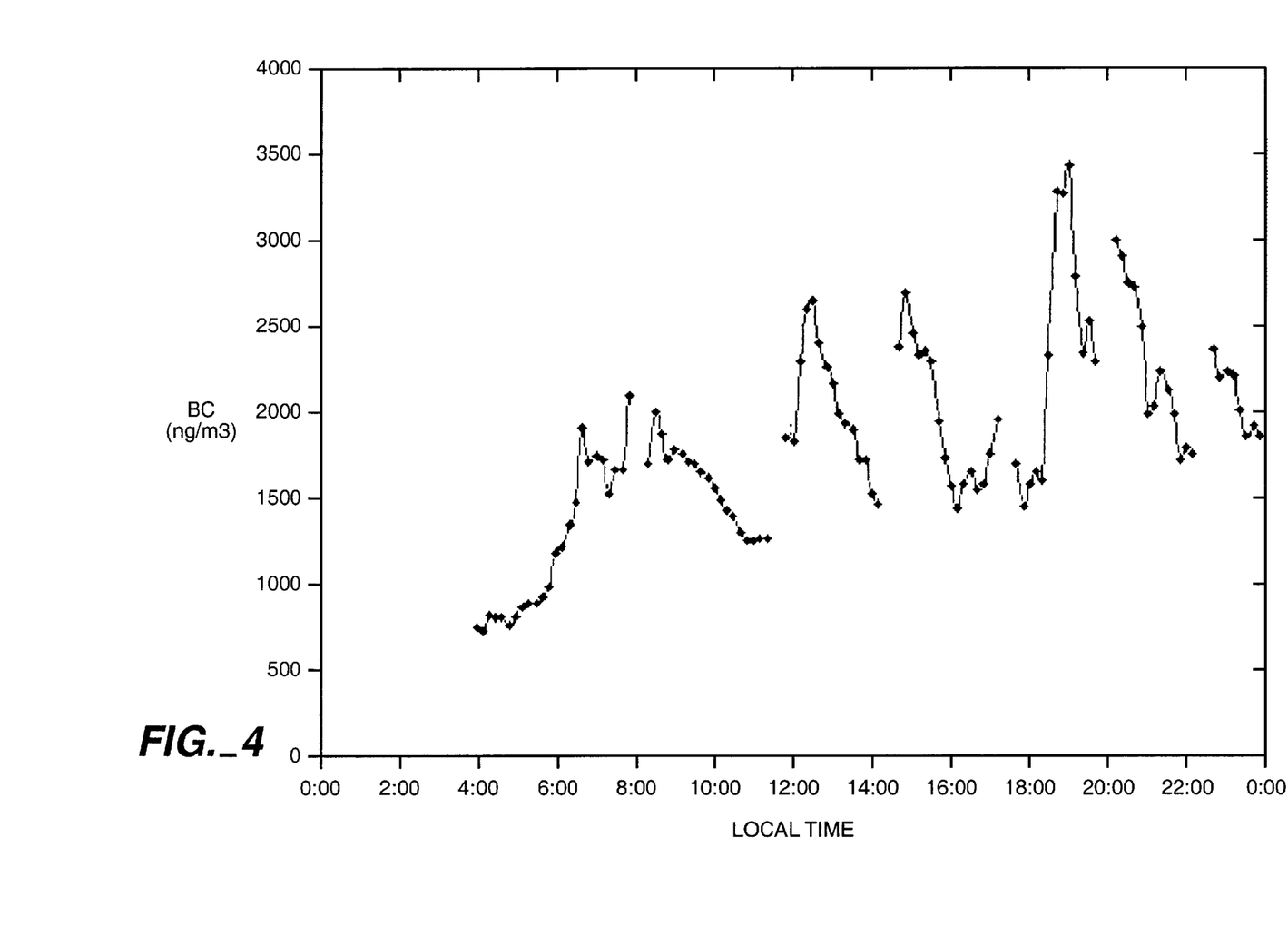
FIG. 4 shows a graph of carbon vs. time generated according to an embodiment of the invention.

Air samples were collected and analyzed with an Aethalometer™ commercially available from Magee Scientific, at a first location. The Aethalometer™ was connected to a Winbook™ XL laptop computer, which received data of the concentration of carbon in the air from the Aethalometer™. The Winbook™ XL laptop computer had software that converted the raw data to graph data and a graphical image of the carbon concentration in the air vs. time. FIG. 4 shows the graphical image generated representing carbon vs. time. The graphical image was stored as the graph data using a standardized protocol so that it could be transmitted from a first wireless communications card in the laptop computer to a wireless communication device at a second location via a publicly accessible cellular telephone network and then viewed using conventional image viewing software. The graph data was then transmitted to a server operated by Holonet, Inc., an Internet service provider, so that the graphical image could be displayed on the Web site "Mageesci.com". A Pentium™-based desktop client computer linked to the Internet was instructed to contact the Mageesci.com Web site. After maneuvering through the Web site, the graphical image was displayed on a display screen on a monitor coupled to the computer. Consequently, the graphical image showing the concentration of carbon in the air over time at the first location was viewed in real time using the client computer.

While embodiments of the invention have been particularly described with respect to particularly illustrated embodiments, it will be appreciated that various alterations, modifications and adaptations may be made based on the present disclosure, and are intended to be within the spirit and scope of the present invention.

What is claimed is:

1. An instrumentation system for monitoring an environmental condition, the system comprising:
    an electronic data collection device for collecting environmental data at a first location, wherein the environmental data comprises data of the concentration of a predetermined substance in the atmosphere;
    a computer processor located at the first location and operatively coupled to the data collection device, the computer processor receiving the collected environmental data from the electronic data collection device;
    an information storage medium operatively coupled to the computer processor and having a computer program for converting the collected data into pictorial image data;
    a first wireless communication element operatively coupled to the computer processor for transmitting the pictorial image data as a radio frequency signal;
    a second wireless communication element for receiving the signal transmitted by the first wireless communication element; and
    a server computer at a second location operatively coupled to the second wireless communication element.

2. The system of claim 1 wherein the first and second wireless communication elements include transceivers.

3. The system of claim 1 wherein the computer processor and the first wireless communication element are housed in a weatherproof housing.

4. The system of claim 1 wherein the pictorial image is a graph.

5. The system of claim 1 wherein the substance comprises carbon.

6. The system of claim 1 further comprising an Internet service provider, wherein the server computer and the client computer transmit data using the Internet service provider.

7. The system of claim 1 wherein the first and second locations are separated by at least about one mile.

8. The system of claim 1 wherein the data collection device comprises a datalogger.

9. The system of claim 1 wherein the data collection device comprises an aethalometer.

10. A method for monitoring an environmental condition, the method comprising:
    electronically collecting environmental data values at a first location, wherein the environmental data comprises data of the concentration of a predetermined substance in the atmosphere;
    electronically converting the collected environmental data values into pictorial image data;
    transmitting the pictorial image data from a first wireless communication element to a second wireless communication element as a radio frequency signal;
    transmitting the pictorial image data from the second wireless communication element to a server computer at a second location;
    transmitting the pictorial image data from the server computer to a client computer optionally located at a third location; and
    displaying a pictorial image from the pictorial image data.

11. The method of claim 10 wherein the first and second wireless communication elements include transceivers.

12. The method of claim 10 wherein collecting environmental data includes collecting environmental data continuously, and wherein generating a pictorial image from the pictorial image data includes continuously generating pictorial images in response to the continuously collected data to provide real time environmental monitoring at the first location.

13. The method of claim 10 wherein the pictorial image data is graph data, and the pictorial image is a graph.

14. The method of claim 10 further comprising re-transmitting the pictorial image data from the first to the second wireless communication element.

15. The method of claim 10 wherein transmitting the pictorial image data from the server computer to a client computer occurs over the Internet.

16. The method of claim 10 wherein the first and third locations are separated by at least about one mile.

17. The method of claim 10 wherein collecting environmental data includes collecting environmental data with a datalogger.

18. The method of claim 10 wherein collecting environmental data includes collecting environmental data with an aethalometer.

19. The system of claim 1 further comprising a client computer located at a third location for receiving the pictorial image data and displaying a pictorial image from the pictorial image data.

* * * * *